(12) United States Patent
Dupler et al.

(10) Patent No.: US 7,778,228 B2
(45) Date of Patent: Aug. 17, 2010

(54) "WIRELESS ISLAND" MOBILE LAN-TO-LAN TUNNELING SOLUTION

(75) Inventors: Craig E. Dupler, Seattle, WA (US); Paul S. Dodd, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 1486 days.

(21) Appl. No.: 10/944,133

(22) Filed: Sep. 16, 2004

(65) Prior Publication Data

US 2006/0056366 A1 Mar. 16, 2006

(51) Int. Cl.
H04W 24/00 (2009.01)
H04W 4/00 (2009.01)

(52) U.S. Cl. ........................... 370/338; 455/423

(58) Field of Classification Search ................ 370/328, 370/338, 401, 310, 329, 331; 455/11.1, 423–425; 714/14, 22, 24
See application file for complete search history.

(56) References Cited

U.S. PATENT DOCUMENTS

| | | | |
|---|---|---|---|
| 6,708,107 B2 * | 3/2004 | Impson et al. | 701/117 |
| 6,970,474 B1 * | 11/2005 | Sinha | 370/401 |
| 2002/0090962 A1 * | 7/2002 | Struhsaker et al. | 455/462 |
| 2003/0174648 A1 * | 9/2003 | Wang et al. | 370/235 |
| 2004/0034800 A1 * | 2/2004 | Singhal et al. | 713/201 |
| 2004/0190210 A1 * | 9/2004 | Leete | 361/90 |
| 2005/0036622 A1 * | 2/2005 | Hay et al. | 380/270 |
| 2005/0073979 A1 * | 4/2005 | Barber et al. | 370/338 |
| 2005/0149442 A1 * | 7/2005 | Adams et al. | 705/51 |
| 2005/0182969 A1 * | 8/2005 | Ginter et al. | 713/201 |
| 2005/0237982 A1 * | 10/2005 | Pankajakshan et al. | 370/338 |
| 2006/0098620 A1 * | 5/2006 | Zhou et al. | 370/352 |
| 2006/0133414 A1 * | 6/2006 | Luoma et al. | 370/466 |
| 2006/0291455 A1 * | 12/2006 | Katz et al. | 370/355 |
| 2007/0288208 A1 * | 12/2007 | Grigsby et al. | 703/2 |

FOREIGN PATENT DOCUMENTS

| | | |
|---|---|---|
| GB | 2 418 329 B | 3/2007 |
| GB | 2 430 595 B | 8/2007 |

* cited by examiner

*Primary Examiner*—William Trost, IV
*Assistant Examiner*—Roberta A Shand
(74) *Attorney, Agent, or Firm*—Tung & Associates

(57) ABSTRACT

A network communication system includes a wireless independent secure local area network design (ISLAND) LAN-to-LAN tunnel terminal that provides a communications link to an access point of a primary network. A network control center, connected to the primary network, continuously monitors the wireless ISLAND LAN-to-LAN tunnel terminal and an alarm is set off when an outage occurs—such as caused by the wireless ISLAND being powered down. The wireless ISLAND may be enclosed in a hardened, portable case subject to security procedures. A method for establishing a secure communications link using a wireless ISLAND LAN-to-LAN tunnel terminal may include providing requirements that consider the wireless ISLAND to be a component of network infrastructure and not an end user client device, providing controls for physical access to the wireless ISLAND, and providing procedures for ensuring the security of the wireless ISLAND and the communications link that it provides.

30 Claims, 3 Drawing Sheets

"WIRELESS ISLAND" MOBILE LAN-TO-LAN TUNNELING SOLUTION

BACKGROUND OF THE INVENTION

The present invention generally relates to secure network communications and, more particularly, to a solution for providing a secure, mobile tunnel for connecting local area networks.

A primary feature of modern network communications is its organization in layers. In general, a "lower" layer may be regarded as being closer to the "physical layer" involving electrical signals and cabling and a "higher" layer may be regarded as being closer to the "payload" information content, e.g., e-mail or file transfer. Each layer may use a protocol. Lower layer protocols define how bits (ones and zeros) are structured to form packets. Packets have a header record that may contain identification, routing and some data about their payload. Located after the header is information payload that is being transported. Using encryption to protect a payload from unauthorized disclosure or modification, a payload may contain any information object, including a whole packet that is being transported from one secure network to another secure network, through an intervening unsecured network without risk of data loss, corruption, or access during transport. This technique for using one packet to transport another packet is called "tunneling." This is because it appears that the two networks on either end of the communications link are really the same network and are seamlessly linked through a tunnel, the tunnel being a route of safe passage through one or more connecting networks. A service which encrypts packets to be sent and decrypts packets received, and which encapsulates packets to be sent and discards the wrapper or transport packet received at the point of connection between the secure and unsecured part of their journey may be referred to as a tunneling protocol. Tunneling protocol is sometimes referred to as an "encapsulation protocol." which may be confusing, because, in general, all protocols encapsulate. Typically in network communications a lower layer protocol encapsulates a higher layer protocol. For example, the network layer protocol (layer 3) usually encapsulates the transport layer packet (layer 4). In contrast, a tunneling protocol encapsulates a packet of the same or lower protocol. For example, a tunneling protocol might encapsulate a layer 3 IPX (Internet Packet Exchange) packet within a layer 3 IP (Internet Protocol) packet, or for example, a LAN-to-LAN (Local Area Network) tunnel might encapsulate a media access control (layer 2) Ethernet frame or layer 3 IP packet within an encrypted layer 3 IP packet.

A typical application for a LAN-to-LAN tunnel would be to connect two buildings via a link that must pass through an untrusted physical space, such as a wire going under a public street, or perhaps through the air between two wireless devices on top of the buildings. Typically, sound security disciplines as applied to LAN-to-LAN tunnels require constant monitoring of the network communication devices, typically routers, at the terminal ends of the tunnel to ensure their integrity. A LAN-to-LAN tunnel invariably involves providing an encrypted data path between two trusted network devices, e.g., routers, at each terminal end of the tunnel. The two trusted network devices typically are equipped with the encryption keys necessary to both encrypt data streams to be sent to each other, and to decrypt data streams received from each other. This makes possession or reliable control of both terminal ends of the tunnel a critical element of a LAN-to-LAN tunnel. The two trusted network devices at the ends of the tunnel, e.g., routers, are, therefore, as a rule, "always" placed in locked data closets for security reasons.

Because of the stringent physical security requirements for the terminal ends of LAN-to-LAN tunnels, LAN-to-LAN tunnels are considered to be impractical or undesirable for many situations, and a number of other approaches to providing computer communications have been used in those situations. For example, on large factory floors with moving assembly lines—such as encountered in the aircraft manufacturing industry—computer workstations are widely used to provide support, such as part number look up, for fabricators working on the aircraft. Communication of such computer workstations may be provided by running wire or fiber optic cables across the floor to network connections. While satisfactory for smaller floors, such cables become more prone to various types of accidents and damage as the size of the factory floor increases.

Another approach has been to use wireless gear with various kinds of security measures imposed. Conventional systems commonly use software data port blocking and password authentication, for example, rather than a hardware solution for security. Some portable wireless routers exist but security measures need to be provided for them, for example, media access control (MAC) address filtering can be used, which, however, can be a very labor intensive method if the computing devices being linked to change frequently. One wireless approach used on a factory floor has been to provide users with an electronic password system that supplies the user a random, periodically changing password that, to log on to the system, the user must type into the system before the password expires. While effective, such approaches have been seen to be inconvenient from the user's point of view. Approaches that require user intervention, such as entering a password, are also impractical for computing devices without a traditional user interface, for example, printers.

As can be seen, there is a need to provide secure wireless links for a number of diverse situations, including large factory floors, assembly lines, automatic test equipment carts, ship-side data terminals, and large automated manufacturing machinery. There is also a need for secure wireless links that do not burden the user with excessive security overhead.

SUMMARY OF THE INVENTION

In one embodiment of the present invention, a network communication system includes a primary network and a wireless independent secure local area network design (ISLAND) LAN-to-LAN tunnel terminal that provides a communications link to a wireless LAN access point of the primary network. A network control center is connected to the primary network. The network control center continuously monitors the wireless ISLAND LAN-to-LAN tunnel terminal and an alarm is set off when an outage occurs in the wireless ISLAND LAN-to-LAN tunnel terminal.

In another embodiment of the present invention, a wireless ISLAND LAN-to-LAN tunnel terminal includes a network router; a wireless workgroup bridge in communication with the router; and a power supply that supplies power to the network router and the wireless workgroup bridge. A case encloses the network router, the wireless workgroup bridge, and the power supply. The case has an external communication interface connected to the network router, and the case has an external power interface connected to the power supply so that the power supply provides power to the network router and the wireless workgroup bridge only when plugged in to power through the external power interface.

In still another embodiment of the present invention, a secure communications link includes an access point to a primary network. A first router on the primary network is configured as a LAN-to-LAN tunnel terminal, with radio frequency (RF) communication for the first router provided by the access point. A portable case contains a second router configured to operate as a LAN-to-LAN tunnel terminal and contains a wireless workgroup bridge in communication with the second router, the wireless workgroup bridge providing RF communication over a channel to the access point. The communications link is monitored from the primary network so that an alarm is set off when an outage occurs in the communications link.

In yet another embodiment of the present invention, a network communication system includes a primary network and a wireless ISLAND LAN-to-LAN tunnel terminal that provides a communications link to an access point of the primary network. The wireless ISLAND includes a portable case containing: a router, a wireless workgroup bridge in communication with the router and providing RF communication for the router over a communication channel to the access point, and a power supply connected to provide power to the router and the wireless workgroup bridge so that the power supply provides power to the router and the wireless workgroup bridge only when plugged in through an external interface and causes an outage when unplugged. The portable case is locked and firmly attached to a large piece of equipment. A network control center is connected to the primary network. The network control center continuously monitors the wireless ISLAND LAN-to-LAN tunnel terminal through the primary network over the communications link; and an alarm is set off in the network control center when the outage occurs.

In a further embodiment of the present invention, a user LAN includes a computing device and a wireless ISLAND LAN-to-LAN tunnel terminal that provides a communications link for the user LAN to an access point of a primary network. The wireless ISLAND LAN-to-LAN tunnel terminal includes a portable case containing: a router, a wireless workgroup bridge in communication with the router and providing RF communication for the router over a communication channel to the access point. The case also contains a power supply connected to provide power to the router and the wireless workgroup bridge so that the power supply provides power to the router and the wireless workgroup bridge only when plugged in through an external interface and causes an outage when unplugged. The portable case is locked and firmly attached to the computer workstation.

In a still further embodiment of the present invention, a method includes operations of: providing a wireless ISLAND that is continuously monitored from a network control center; advising a network control center of any planned outage of the wireless ISLAND; and taking remedial action in the case of an unexpected outage of the wireless ISLAND.

In a still further embodiment of the present invention, a method includes operations of: (1) providing requirements for establishing a secure communications link using a wireless ISLAND LAN-to-LAN tunnel terminal, including considering the wireless ISLAND LAN-to-LAN tunnel terminal to be a component of network infrastructure and not an end user client device; (2) providing controls for physical access to the component of network infrastructure comprising the wireless ISLAND LAN-to-LAN tunnel terminal; and (3) providing procedures for ensuring the security of the wireless ISLAND LAN-to-LAN tunnel terminal and the communications link that it provides, wherein at least one of the procedures includes continuously monitoring the wireless ISLAND LAN-to-LAN tunnel terminal from a network control center so that an alarm is set off whenever an outage occurs.

These and other features, aspects and advantages of the present invention will become better understood with reference to the following drawings, description and claims.

DETAILED DESCRIPTION OF THE INVENTION

Figure 1:
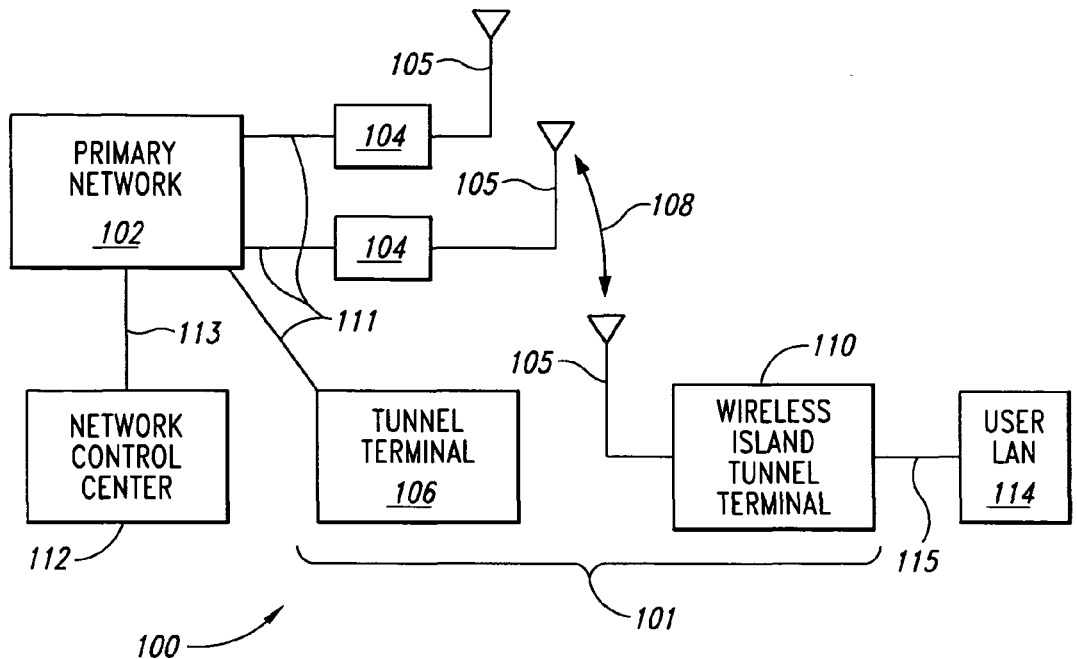
FIG. 1 is a system block diagram illustrating a system for establishing secure, mobile, wireless communications links in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides secure wireless links for local area networks (LAN) in a wide variety of situations that may be encountered in manufacturing and other commercial environments. For example, embodiments of the present invention may provide mobile, secure communications links to a primary network for ship-side data terminals, automatic test equipment carts, computer workstations for moving assembly lines, and large automated machinery such as GEMCOR™ aircraft fastener installation machines. One embodiment is useful on aircraft assembly lines for linking an airplane on-board network to the manufacturer's network during final assembly and on the ramps. One embodiment differs from the prior art by providing a way of implementing LAN-to-LAN tunneling using a mobile device not tied to a single application and in the way the router in the is used in the LAN-to-LAN tunnel to extend the range of wireless devices and the security system used. The combination of a portable router with security features enabling easy hookup for wireless devices is believed to be novel.

Routers by themselves are not normally thought of as mobile devices, but a router that is a member of a LAN-to-LAN tunnel pair would normally never be thought of as being placed in other than a physically secure, non-mobile situation. For the reasons described above, tunnel routers, as a general rule, are always placed in locked data closets. For a tunnel router and associated equipment providing a LAN-to-LAN tunnel terminal placed in a mobile package—such as an easily portable, suitcase-like box, for example—mere possession of the package gives the possessor a wide open path into the primary network, which may be, for example, a corporation intranet. For example, a possessor removing such package from the building could, without the safeguards provided by one embodiment, carry the package out to the parking lot, and so long as the signal reaches back to the building, there would be an unsecured port there to the primary network that anyone might tap into.

Thus, such an invention was counter-intuitive to experienced security and network operations personnel, who believed that such an invention was not feasible. Indeed, such a package would generally not be commercially viable for the personal consumer, but is especially useful in the corporate environment due to its unique packaging of a bundle of several commercial products, and its original procedural approach to maintaining the security of that packaging. For example, in one embodiment, the mobile LAN-to-LAN tunnel terminal is required to be left on all the time, even when not in use, any time it is not in a traditional locked data closet. Thus, a security monitor and alarm may be left active to constantly monitor the mobile LAN-to-LAN tunnel terminal. If the mobile tunnel terminal were to be unplugged to be moved, an alarm would go off, for example, in a network control center. So a procedure for delivering possession and control of a particular mobile LAN-to-LAN tunnel terminal to a user, i.e., a check-out procedure, may involve having a custodian call the network control center to advise that a wireless independent secure local area network design (ISLAND) LAN-to-LAN tunnel terminal identified as the particular one to be checked out is about to be shut down for a move. Thus, the alarm set off is expected, and no further action is taken regarding the alarm. In contrast, no such procedures are known in the prior art, which relies for security on more traditional measures, such as locating the LAN-to-LAN tunnel terminal in an immobile, physically secure building and room secured using traditional access control measures, for example, door locks and attended facilities.

Referring now to the figures, FIG. 1 illustrates a network communication system 100 for establishing a secure, mobile, wireless communications link 101, in accordance with one embodiment of the present invention. Network communication system 100 may include a primary network 102, which may be a private communications network, for example, a corporate intranet network including communications between numerous computers and other network devices (not shown). Primary network 102 may include several wireless access points 104, each having an antenna 105, as known in the art. Only two access points 104 are shown for illustrative purposes in FIG. 1. Primary network 102 may include one or more LAN-to-LAN tunnel terminals in accordance with an embodiment of the present invention, such as a router as LAN-to-LAN tunnel terminal 106 shown in FIG. 1. LAN-to-LAN tunnel terminal 106 may provide a secure encapsulated link 101 via the primary network 102, channels 111, an access point 104, antenna 105, and over channel 108 over which LAN-to-LAN tunnel terminal 106 and wireless ISLAND LAN-to-LAN tunnel terminal 110 may communicate. The security of communications link 101 may be provided by any cryptographic protocol typically provided by LAN-to-LAN routers, for example Internet Protocol Security (IPSEC). Operation and status of wireless ISLAND LAN-to-LAN tunnel terminal 110 may be constantly monitored from network control center 112 over channel 108 via channels 111 and connection 113, respectively, between LAN-to-LAN tunnel terminal 106 and primary network 102 and between primary network 102 and network control center 112. Wireless ISLAND LAN-to-LAN tunnel terminal 110 may be connected to a user LAN 114 via connection 115. Connection 115 may be provided, for example, using an RJ-45 Ethernet connector, as known in the art. User LAN 114 may include a computer, for example, as well as other network devices and may be placed in a variety of situations including, but not limited to, the examples described above—such as aircraft manufacturing assembly lines. Monitoring of wireless ISLAND LAN-to-LAN tunnel terminal 110 from network control center 112 may enable a number of security procedures for safeguarding the integrity of wireless ISLAND LAN-to-LAN tunnel terminal 110 and communications over channel 108. Such security procedures, for example, may include the check-out procedure described above.

Figure 2:
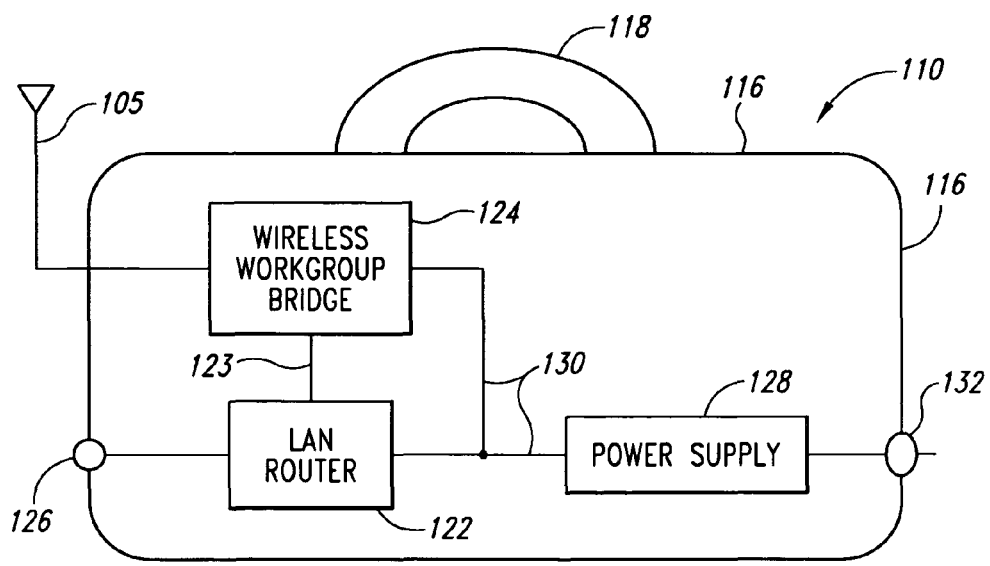
FIG. 2 is a block diagram showing a wireless independent secure local area network design (ISLAND) LAN-to-LAN tunnel terminal in accordance with one embodiment of the present invention.
Figure 3:
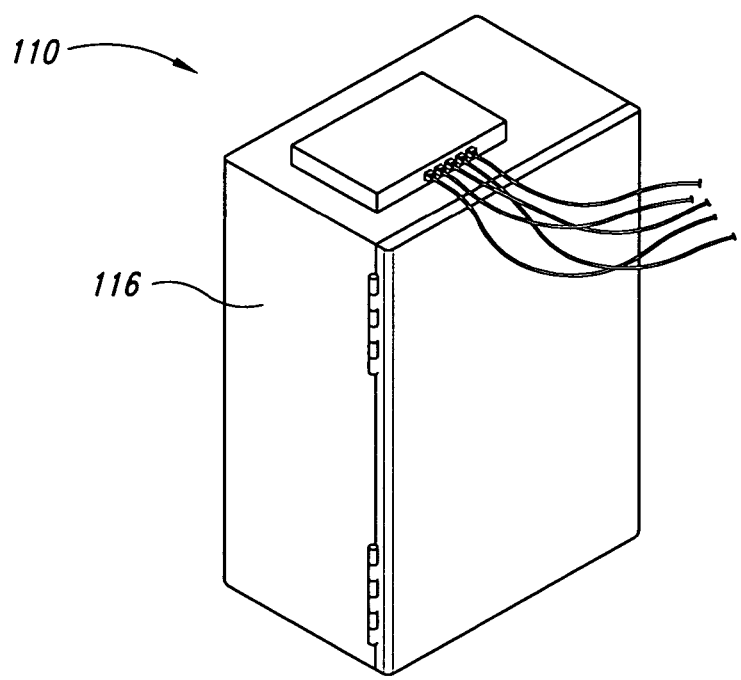
FIG. 3 is a perspective view of a wireless ISLAND LAN-to-LAN tunnel terminal in accordance with one embodiment of the present invention.
Figure 4:
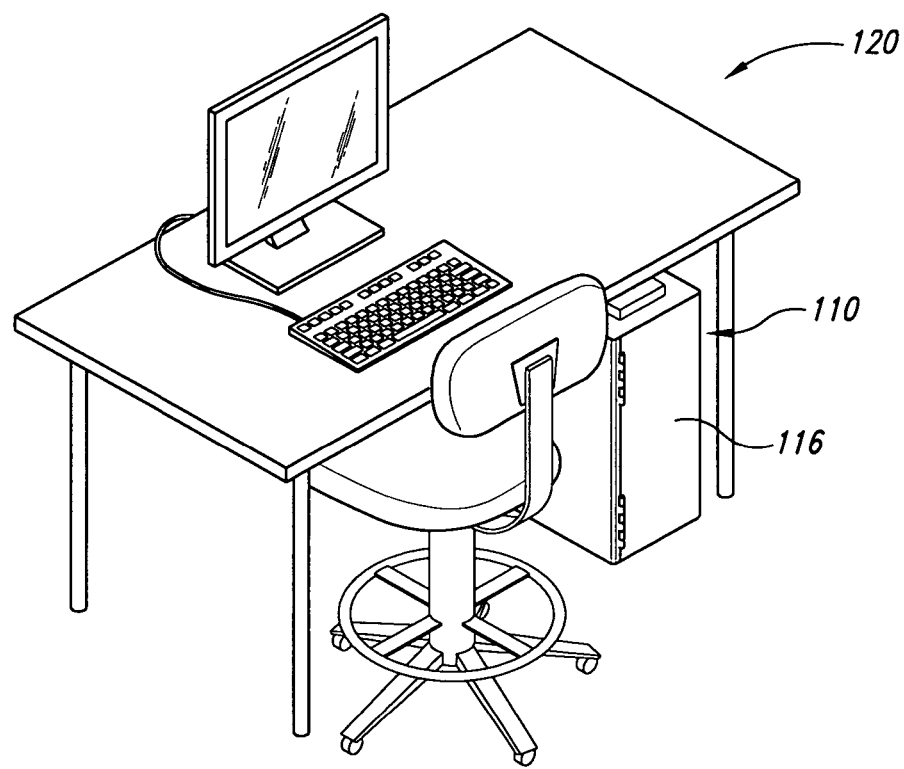
FIG. 4 is a perspective view of a wireless ISLAND LAN-to-LAN tunnel terminal attached to a computer workstation in accordance with one embodiment of the present invention.

FIG. 2 shows wireless ISLAND LAN-to-LAN tunnel terminal 110 in more detail. Wireless ISLAND LAN-to-LAN tunnel terminal 110 may be packaged in a case 116, shown more clearly in FIG. 3. As shown in FIGS. 3 and 4, case 116 may be of a size to be portable. Portability is indicated schematically by handle 118 in FIG. 2. As shown in FIGS. 3 and 4, case 116 may be dimensioned about 12 inches high by 12 inches wide by 6 inches deep. For security, case 116 may be firmly attached to a workstation cart—such as cart 120 shown in FIG. 4. Security may be provided by the cart 120 being either not easily moveable or large enough that movement of cart 120 is easily detectable. Also for security, case 116 may be made of metal or hard plastic, may be locked with keys subject to security control procedures, and may be sealed, for example, with tamper-evident seals.

Returning to FIG. 2, wireless ISLAND LAN-to-LAN tunnel terminal 110 may include a LAN router 122. Wireless ISLAND LAN-to-LAN tunnel terminal 110 may include a wireless workgroup bridge 124 that may communicate with router 122 over network link 123. Wireless workgroup bridge 124 may provide a wireless communications link, e.g., two-way radio frequency (RF) communication, between router 122 and an access point 104, over channel 108. Wireless workgroup bridge 124 may provide RF communication using antenna 105, which may be external to case 116, as indicated in FIG. 2, but which may also be internally mounted in case 116. Router 122 may have an external communication interface 126 through case 116, which may provide communication between router 122 and network devices—such as user LAN 114. External interface 126 may be provided, for example, using an RJ-45 network interface. Wireless ISLAND LAN-to-LAN tunnel terminal 110 may include a power supply 128, that supplies power to router 122 and wireless workgroup bridge 124 through power lines 130. Power supply 128 may have an external power interface 132 through case 116, which may provide power to power supply 128, for example, from a 110 or 120 Volt alternating current (AC) power line. Thus, each "wireless ISLAND" 110 may have just two external interfaces: a plug for AC power (interface 132) and an RJ-45 network interface (interface 126), the simplicity of which may further enhance both physical and network communication security of wireless ISLAND 110.

Router 122, wireless workgroup bridge 124, and power supply 128 may be implemented, for example, using standard, off-the-shelf components designed and used for static locations. Standard components used to construct a LAN-to-LAN tunnel would typically be bolted down, often in a 19" electronics equipment rack. Contrary to the prior art, wireless ISLAND LAN-to-LAN tunnel terminal 110 contains the components—e.g., router 122, radio 124—in a portable box—e.g., case 116—which can be set-up anywhere, for example, in a factory with AC power, implementing what logically appears to be a "wired" network port at that location.

Figure 5:
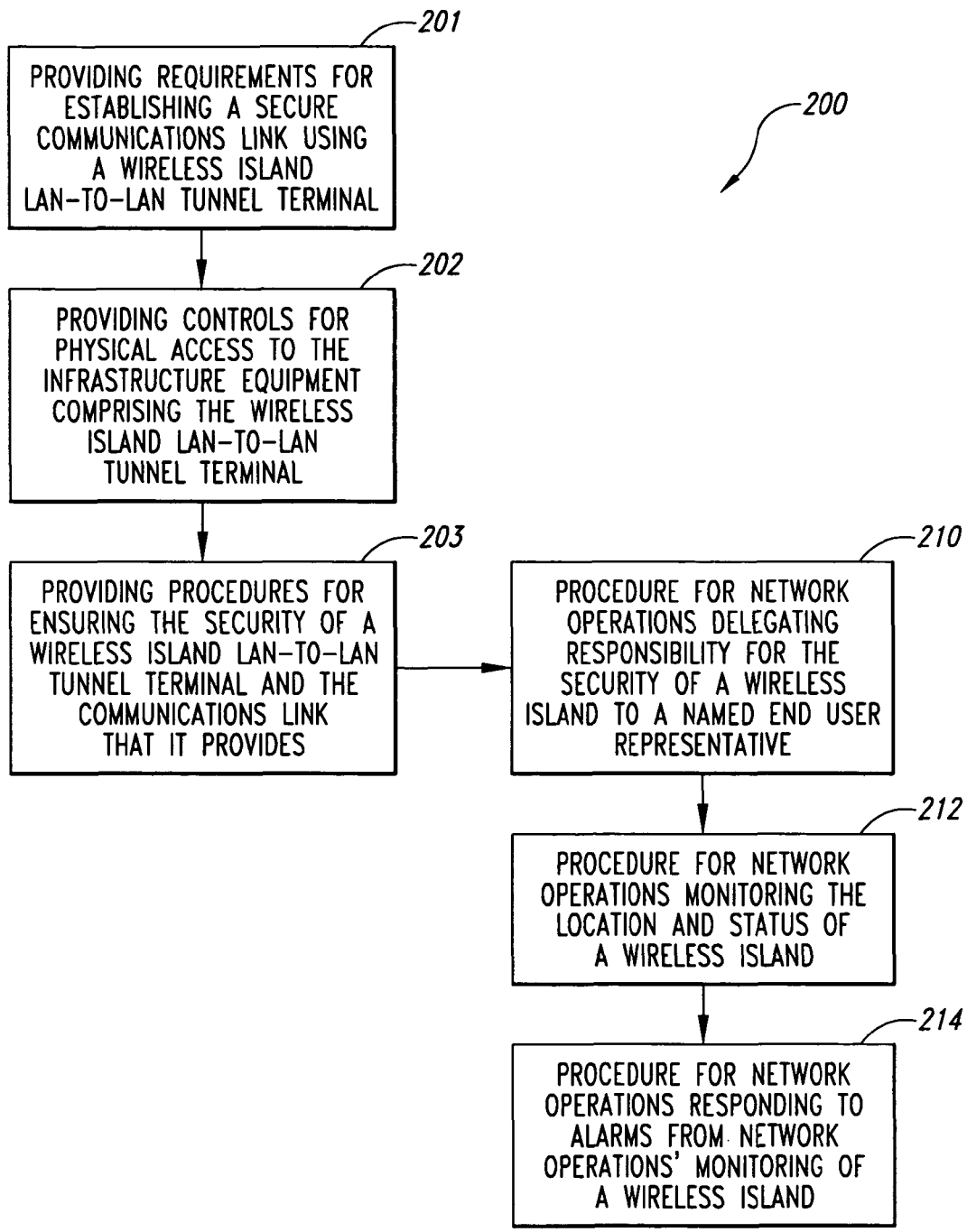
FIG. 5 is a block diagram of security procedures for establishing secure, mobile, wireless communications links in accordance with one embodiment of the present invention.

FIG. 5 illustrates a method 200 and security procedures for establishing secure, mobile, wireless communications links—such as link 101 comprising a tunnel from LAN-to-LAN tunnel terminal 106 to wireless ISLAND LAN-to-LAN tunnel terminal 110, via primary network 102, channels 111, access point 104, channel 108, and antennas 105. A first element of method 200, exemplified by operation 201, may be that of providing requirements for establishing a secure communications link—such as communications link 101—using a wireless ISLAND—such as wireless ISLAND LAN-to-LAN tunnel terminal 110. The requirements for establishing a secure communications link using a wireless ISLAND may include: (1) requiring that physical access controls for connector 126 are at least as secure as any other wired primary network jack—for a primary network such as primary network 102—because physical access to the user LAN, e.g. user LAN 114, side of the wireless ISLAND may enable direct access to the primary network; (2) requiring that management and security responsibility lie in network operations, e.g., network control center 112, not the end user, e.g., a user of user LAN 114, because the wireless ISLAND may be considered to be a component of network infrastructure and not an end user client device; and (3) requiring that network infrastructure—such as wireless ISLAND LAN-to-LAN tunnel terminal 110—must be protected against tampering, disabling, reconfiguration, and theft, e.g. by requiring, in cases without sufficient preventive controls (e.g. locks, physical immobilization), a detection system (e.g. alarm) that can cause a reaction (e.g. guard dispatch, timely deactivation).

Another element of method 200, exemplified by operation 202, may be that of providing controls for physical access to the infrastructure equipment—such as case 116, router 122, wireless workgroup bridge 124, and power supply 128—comprising a wireless ISLAND LAN-to-LAN tunnel terminal—such as wireless ISLAND LAN-to-LAN tunnel terminal 110. Controls for physical access to infrastructure equipment may include: (1) making the wireless ISLAND enclosure—e.g., case 116—of metal or hard plastic, and locking the enclosure to deter intrusion; (2) placing control of keys with network operations, e.g., network control center 112, not the end user, because the enclosure contains infrastructure equipment; (3) using tamper-evident seals if the enclosure will be mounted in a place that can not be easily viewed; (4) firmly affixing the enclosure to the facility, or to a piece of equipment that is large enough to minimize the chance of an undetected loss, for example, securing case 116 of wireless ISLAND LAN-to-LAN tunnel terminal 110 to a workstation cart 120 as shown in FIG. 4.

Yet another element of method 200, exemplified by operation 203, may be that of providing procedures for ensuring the security of a wireless ISLAND LAN-to-LAN tunnel terminal—such as wireless ISLAND LAN-to-LAN tunnel terminal 110—and the communications link that it provides—such as communications link 101.

Procedures for ensuring the security of a wireless ISLAND and its associated communications link—or LAN-to-LAN tunnel—may include a procedure 210 for network operations, e.g., network control center 112, delegating responsibility for the security of a wireless ISLAND—such as wireless ISLAND LAN-to-LAN tunnel terminal 110—to a named end user representative (e.g., check-out procedures, as described above). Procedure 210 may include training the named end user representative in the procedures of ensuring the security of a wireless ISLAND LAN-to-LAN tunnel terminal and the communications link that it provides. Procedure 210 may include keeping the name and contact information of the named end user representative on file at the appropriate network control center, e.g., network control center 112, for response to alarms. Procedure 210 may further include contacting the named end user representative at least monthly to verify possession of the wireless ISLAND—such as wireless ISLAND LAN-to-LAN tunnel terminal 110. Procedure 210 may also include placing any wireless ISLAND that is intended to be used by anyone other than the named end user representative under control of a tool crib so that tool crib authorization and check-out procedures can be used.

Procedures for ensuring the security of a wireless ISLAND and LAN-to-LAN tunnel may also include a procedure 212 for network operations' monitoring of the location and status of a wireless ISLAND—such as wireless ISLAND LAN-to-LAN tunnel terminal 110. Procedure 212 may include keeping the location of every wireless ISLAND on file at the network control center, e.g., network control center 112. Procedure 212 may include actively monitoring the router—such as router 122—in a wireless ISLAND by the network control center at all times and keeping the wireless ISLAND plugged in to AC power while in storage to enable continuous monitoring. For long term storage without power, procedure 212 may thus include that (1) the network control center must be notified and (2) the wireless ISLAND must be returned to the control of network operations, e.g., network control center 112, to be physically secured as network infrastructure in a locked data closet. Procedure 212 may further include that any planned outage, such as when a wireless ISLAND is unplugged to be moved from one location to another, must be preceded by a notification to the network control center by the named end user representative (or an agreed upon delegate in the case of a tool crib) of the nature of the outage, the location of the wireless ISLAND, and the approximate time interval of the outage.

Procedures for ensuring the security of a wireless ISLAND and LAN-to-LAN tunnel may also include a procedure 214 for network operations, e.g., network control center 112, to respond to alarms, e.g., unexpected outage in the network control center monitoring of a wireless ISLAND—such as wireless ISLAND LAN-to-LAN tunnel terminal 110. Procedure 214 may include treating any prolonged—other than momentary loss of connectivity to the wireless ISLAND, which can typically be attributed to radio signal trouble—unexpected outage in the network control center monitoring—such as monitoring according to procedure 212—as a potential compromise of security. Procedure 214 may include the following steps for treating such a case:

1. Attempt to contact the named end user representative to determine if the wireless ISLAND is being moved and it is a case of forgetting to give prior notification.
2. If the named end user representative can not be reached immediately, temporarily disable access from the identified wireless ISLAND to the peer infrastructure router, e.g., disable link 101 between wireless ISLAND LAN-to-LAN tunnel terminal 110 and LAN-to-LAN tunnel terminal 106.
3. When the named end user representative (or delegate) has an outage ticket issued, collect the necessary location information for the identified wireless ISLAND before re-enabling access.
4. If the named end user representative is not able to account for the loss of connectivity, permanently remove access for the identified wireless ISLAND on the peer infrastructure router, e.g., permanently remove access via link 101 between wireless ISLAND LAN-to-LAN tunnel terminal 110 and LAN-to-LAN tunnel terminal 106 and report the loss for appropriate remedial action to be taken.

Procedure 214 may further include taking an appropriate remedial action in the case of repeated, frequent alarms due to poor radio connectivity, which for example, may indicate an incorrectly implemented wide local area network (WLAN), or use of the wireless ISLAND in an area that is not well covered by access points—such as access points 104. An appropriate remedial action, for example, may include performing a new site survey. Procedure 214 may also include taking appropriate remedial actions in the case of a named end user representative repeatedly forgetting to notify the network control center prior to a planned outage, for example, additional training, or removal of the wireless ISLAND and corrective action for the employee in the case of continued non-compliance.

It should be understood, of course, that the foregoing relates to exemplary embodiments of the invention and that modifications may be made without departing from the spirit and scope of the invention as set forth in the following claims.

We claim:

1. A network communication system, comprising:
    a primary network;
    a portable wireless independent secure local area network design (ISLAND) LAN-to-LAN tunnel terminal that provides a secure communications link from an external LAN to an access point of said primary network; and
    a network control center connected to said primary network, wherein said network control center continuously monitors said wireless ISLAND LAN-to-LAN tunnel terminal and an alarm is set off and access between the wireless ISLAND LAN-to-LAN and the primary network is disabled by said network control center when an outage occurs in said wireless ISLAND LAN-to-LAN tunnel terminal.

2. The network communication system of claim 1, wherein said wireless ISLAND LAN-to-LAN tunnel terminal has a power supply that is plugged in to power while in storage.

3. The network communication system of claim 1, wherein:
    said wireless ISLAND LAN-to-LAN tunnel terminal has a power supply with an external power interface for plugging said power supply into power; and
    said outage occurs whenever said power supply is unplugged.

4. The network communication system of claim 1, wherein said network control center is notified preceding a planned occurrence of said outage.

5. The network communication system of claim 1, wherein said network control center takes a remedial action when an unexpected occurrence of said outage occurs.

6. The network communication system of claim 1, wherein said network control center, and not an end user, has security responsibility for physical access to said wireless ISLAND LAN-to-LAN tunnel terminal.

7. The network communication system of claim 1, wherein said network control center delegates security responsibility for said wireless ISLAND LAN-to-LAN tunnel terminal to a named end user.

8. A portable wireless independent secure local area network design (ISLAND) LAN-to-LAN tunnel terminal comprising:
    a portable network router;
    a wireless workgroup bridge in communication with said network router, said wireless workgroup bridge providing a secure wireless communications link to an access point of a primary network;
    a power supply that supplies power to said network router and said wireless workgroup bridge;
    a portable case enclosing said network router, said wireless workgroup bridge, and said power supply, wherein:
    said case has a secure external communication interface connected to said network router; and
    said case has an external power interface connected to said power supply so that said power supply provides power to said network router and said wireless workgroup bridge only when plugged in to power through said external power interface;
    wherein said portable network router is configured to be continuously monitored and disabled by a network control center upon the occurrence of an outage caused by unplugging said power supply.

9. The wireless ISLAND LAN-to-LAN tunnel terminal of claim 8 wherein: said case is made from a material chosen from the group consisting of:
    metal and hard plastic;
    said case has two external interfaces including said external communication interface and said external power interface; and
    said case has no more than two external interfaces.

10. The wireless ISLAND LAN-to-LAN tunnel terminal of claim 8 wherein said case is locked.

11. The wireless ISLAND LAN-to-LAN tunnel terminal of claim 8 wherein:
    said case is locked with a lock; and
    a key to said lock is in control of a network control center.

12. The wireless ISLAND LAN-to-LAN tunnel terminal of claim 8 wherein said case is sealed with a tamper-evident seal.

13. The wireless ISLAND LAN-to-LAN tunnel terminal of claim 8 wherein said case is firmly affixed to a piece of equipment large enough to minimize the chance of an undetected loss.

14. The wireless ISLAND LAN-to-LAN tunnel terminal of claim 8 wherein said case is secured to a workstation cart.

15. The wireless ISLAND LAN-to-LAN tunnel terminal of claim 8 wherein said case is secured to a workstation cart and connected to a user LAN on said workstation cart via said external communication interface.

16. A secure communications link comprising:
    a first router on a primary network, said first router configured as a LAN-to-LAN tunnel terminal;
    an access point on said primary network, said access point providing RF communication for the first router; and
    a portable case containing a second router configured to operate as a independent secure local area network design (ISLAND) LAN-to-LAN tunnel terminal and containing a wireless workgroup bridge in communication with said second router, said wireless workgroup bridge and said second router providing a secure RF communication link over a channel between said access point and an external LAN;
    wherein said RF communications link is configured to be continuously monitored from said primary network so that an alarm is set off and access between the ISLAND LAN-to-LAN and the primary network is disabled when an outage occurs in said RF communications link, said monitoring and disabling by a network control center connected to said primary network.

17. The secure communications link of claim 16 further comprising:
    a power supply contained in said case, said power supply connected to provide power to said second router so that:
    said power supply provides power to said second router only when plugged in through an external interface, and said outage occurs whenever said power supply is unplugged.

18. The secure communications link of claim 16 further comprising:

a power supply contained in said case, said power supply connected to provide power to said wireless workgroup bridge so that:

said power supply provides power to said wireless workgroup bridge only when plugged in through an external interface, and said outage occurs whenever said power supply is unplugged.

19. The secure communications link of claim 16 wherein said portable case is locked and includes a detection system that deactivates said communications link when said portable case is tampered with.

20. A network communication system comprising:

a primary network;

a portable wireless independent secure local area network design (ISLAND) LAN-to-LAN tunnel terminal including a router that provides a secure communications link to said primary network from an external LAN via an access point of said primary network, including:

a portable case containing:

said router, a wireless workgroup bridge in communication with said router and providing RF communication for said router over a communication channel to said access point, and a power supply connected to provide power to said router and said wireless workgroup bridge so that said power supply provides power to said router and said wireless workgroup bridge only when plugged in through an external interface and causes an outage when unplugged;

wherein said portable case is locked and firmly attached to a large piece of equipment; and a network control center connected to said primary network, wherein:

said network control center continuously monitors said wireless ISLAND LAN-to-LAN tunnel terminal through said primary network over said communications link; and an alarm is set off at said network control center and access between the wireless ISLAND LAN-to-LAN and the primary network is disabled b said network control center when said outage occurs.

21. The network communication system of claim 20 wherein a key to said lock is in control of said network control center.

22. A user LAN comprising:

a computing device; and a portable wireless independent secure local area network design (ISLAND) LAN-to-LAN tunnel terminal that provides a secure communications link for said user LAN to an access point of a primary network, said ISLAND LAN-to-LAN tunnel terminal including:

a portable case containing:

a router, a wireless workgroup bridge in communication with said router and providing RF communication for said router over a communication channel to said access point, and a power supply connected to provide power to said router and said wireless workgroup bridge so that said power supply provides power to said router and said wireless workgroup bridge only when plugged in through an external interface and causes an outage when unplugged;

wherein said portable case is locked and firmly attached to said computing device, and wherein said wireless workgroup bridge is configured to be continuously monitored and disabled upon the occurrence of a power outage, said monitoring and disabling by a network control center connected to said primary network.

23. A method comprising operations of:

providing a portable wireless independent secure local area network design (ISLAND) that provides a secure communication link between an external network and an access point of a primary network, wherein said ISLAND is continuously monitored from a network control center comprising said primary network;

advising said network control center of any planned outage of said wireless ISLAND; and taking remedial action in the case of an unexpected outage of said wireless ISLAND, said remedial action comprising disabling access between the wireless ISLAND and the primary network by said network control center.

24. The method of claim 23 wherein said wireless ISLAND provides a LAN-to-LAN tunnel communications link.

25. The method of claim 23, further including a procedure of: keeping said wireless ISLAND plugged in to AC power while in storage to enable continuous monitoring.

26. The method of claim 23, further including a procedure of: delegating responsibility for the security of said wireless ISLAND to a named end user representative.

27. The method of claim 23, further including a control of:

firmly affixing an enclosure of said wireless ISLAND to a piece of equipment that is large enough to minimize the chance of an undetected loss of said wireless ISLAND.

28. A method comprising operations of:

providing requirements for establishing a secure communications link between an external LAN network and an access point of a primary network using a portable wireless independent secure local area network design (ISLAND) LAN-to-LAN tunnel terminal, said requirements including considering the wireless ISLAND LAN-to-LAN tunnel terminal to be a component of network infrastructure and not an end user client device;

providing controls for physical access to the component of network infrastructure comprising the wireless ISLAND LAN-to-LAN tunnel terminal; and providing procedures for ensuring the security of the wireless ISLAND LAN-to-LAN tunnel terminal and the secure communications link that it provides, wherein at least one of said procedures includes continuously monitoring the wireless ISLAND LAN-to-LAN tunnel terminal from a network control center comprising said primary network so that an alarm is set off and access between the wireless ISLAND LAN-to-LAN and the primary network is disabled by said network control center whenever an outage occurs in said wireless ISLAND LAN-to-LAN.

29. The method of claim 28, wherein at least one of said procedures includes a procedure for network operations delegating responsibility for the security of a wireless ISLAND to a named end user representative.

30. The method of claim 28, wherein at least one of said procedures includes a procedure for the network control center responding to said alarm.

* * * * *